(12) United States Patent  (10) Patent No.: US 7,409,270 B2
Schibli et al.  (45) Date of Patent: Aug. 5, 2008

(54) CONTROL APPARATUS FOR DEACTIVATING AN ELECTRICAL LOAD DURING CONGESTION PERIODS

(75) Inventors: Patrick Urs Schibli, Illnau (CH); Peter Hauser, deceased, late of Uster (CH); by Ursula Hauser, legal representative, Uster (CH)

(73) Assignee: Landis+Gyr AG, Zug (CH)

( * ) Notice: Subject to any disclaimer, the term of this patent is extended or adjusted under 35 U.S.C. 154(b) by 9 days.

(21) Appl. No.: 11/507,344

(22) Filed: Aug. 21, 2006

(65) Prior Publication Data

US 2007/0121512 A1  May 31, 2007

(30) Foreign Application Priority Data

Nov. 28, 2005 (AU) ............................. 2005239620

(51) Int. Cl.
*G05D 9/00* (2006.01)
*G05D 23/00* (2006.01)
(52) U.S. Cl. ....................................... 700/295; 700/296
(58) Field of Classification Search ................. 700/295, 700/296
See application file for complete search history.

(56) References Cited

U.S. PATENT DOCUMENTS 4,264,960 A * 4/1981 Gurr ........................... 700/295
4,977,515 A * 12/1990 Rudden et al. ............... 700/296
5,903,213 A    5/1999 Hodge et al. ............ 340/310.01

FOREIGN PATENT DOCUMENTS

GB             2171278 A       8/1986

* cited by examiner

*Primary Examiner*—Michael D Masinick
(74) *Attorney, Agent, or Firm*—Ohlandt, Greeley, Ruggiero & Perle, LLP; George W. Rauchfuss, Jr.

(57) ABSTRACT

A control apparatus (1) for controlling an electrical load (2) has a housing (28), a plug (12) mounted to the housing (28) for connecting the control apparatus (1) to the power outlet (4), a socket (10) mounted to the housing (28) for connecting the control apparatus (1) to the electrical load (2), and a receiver unit (6) mounted within the housing (28) and coupled to the plug (12) and the socket (10). In use, the receiver unit (6) receives a control signal that is indicative of an impending congestion period. Upon receipt of the control signal, the receiver unit (6) interrupts supply of power to the socket (10) and, hence, switches the electrical load (2) off.

12 Claims, 1 Drawing Sheet

CONTROL APPARATUS FOR DEACTIVATING AN ELECTRICAL LOAD DURING CONGESTION PERIODS

BACKGROUND OF THE INVENTION

The various embodiments of the present invention relate generally to metering electricity. More particularly, the various embodiments relate to an apparatus for controlling an electrical load.

Public utility companies (PUCs) are faced with customers' changing energy consumption patterns. For example, the residential use of modern loads, such as air conditioning systems or swimming pool pumping and heating systems, becomes more widespread. These modern loads contribute to a substantial part to the peak loads during hot weather periods. Although such peak loads occur only during a relatively short period of time, PUCs need to maintain distribution networks that have sufficient capacity for these peak loads. That is, modern loads such as air-conditioning systems require the electricity network infrastructure to be larger than otherwise necessary.

PUCs try to mitigate demand peaks by storing converted energy, for example, through the domestic hot water supply or heating systems. In addition, PUCs implement strategies to influence energy consumption, such as interruptive demand tariffs or congestion pricing. Under congestion pricing, for example, the price of a kilowatthour (kWh) of electricity may vary depending on the time of the day. Known electricity meters installed in domestic households interface to ripple control receivers to measure electricity consumption as a function of tariff structure and time. One example of an electricity meter having a communications module is an Enermet E120M module. A ripple control receiver is described, for example, in GB 2 171 278.

Despite these measures energy consumption is likely to increase over time, mostly due to the growth of modern loads. To maintain a sufficient network capacity, the distribution infrastructure needs to be upgraded to keep up with the increasing energy demand. However, upgrading the infrastructure requires substantial financial investments PUCs are hesitant to make.

SUMMARY OF CERTAIN INVENTIVE ASPECTS

Therefore, it is an object of the various embodiments described herein to provide for an alternative strategy for influencing energy consumption. Accordingly, one aspect involves a control apparatus for interconnecting an electrical load to a power outlet, for example, a wall-mounted power outlet. The control apparatus is configured to receive and to process a control signal, for example, a ripple control signal, that indicates the beginning of a congestion period, during which a higher congestion rate is applicable. Upon receipt of that signal, the control apparatus interrupts the supply of power to the electrical load for the duration of the congestion period. In one embodiment, a consumer may choose to override the power interruption and continue receiving power at the higher congestion rate by pressing an override button.

More particularly, the control apparatus has a housing, a plug mounted to the housing for connecting the control apparatus to the power outlet, a socket mounted to the housing for connecting the control apparatus to the electrical load, and a receiver unit mounted within the housing and coupled to the plug and the socket. The receiver unit is configured to receive a control signal (for example, over an electricity distribution network or a communications network) that is indicative of an impending congestion period, and wherein the receiver unit is configured to interrupt supply of power to the socket upon receipt of the control signal.

According to another aspect, a method of controlling an electrical load includes receiving at a receiver unit of a control apparatus, which is coupled between a power outlet and an electrical load, a control signal that is indicative of an impending congestion period. Further, the method includes interrupting a supply of power to the electrical load upon receipt of the control signal.

On a large scale, the suggested alternative strategy allows more modern loads to be connected to the existing electricity distribution network. The PUCs, therefore, can defer investments into the upgrading of the distribution network.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

DETAILED DESCRIPTION OF CERTAIN INVENTIVE EMBODIMENTS

The certain inventive embodiments are described herein with an occasional reference to air-conditioning systems for use, for example, in domestic households. However, it is contemplated that an air-conditioning system is merely one example of an energy consuming load and that other exemplary energy consuming loads include swimming pool pumps and filters, freezer chests, washing machines, irrigation pumps and any other load that can be turned off for a certain time period without adverse effects.

Further, the inventive embodiments are hereinafter described with reference to the known ripple control technology. As such, these embodiments are not intended to be limited to the ripple control technology, and it is contemplated that any other technology may be used that allows sending control information over an electricity distribution network (as electrical signals) or a communications network (as electrical or radio signals), such as a radio communications network, to a receiving unit.

Figure 1:
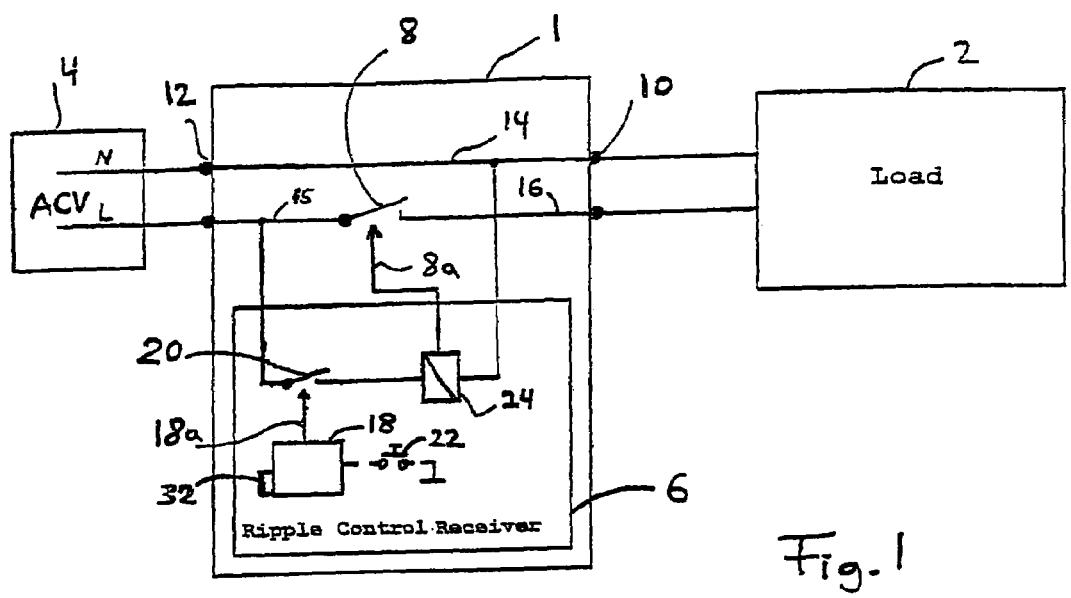
FIG. 1 is a schematic illustration of a control unit coupled between a power outlet and a load.

FIG. 1 is a schematic illustration of a control apparatus 1 coupled between a wall-mounted AC power outlet 4 (ACV) and a load 2, such as an air-conditioning system. The control apparatus 1 has a plug 12 (a male plug connector) to connect to a socket of the wall-mounted power outlet 4, and a socket 10 (female plug connector) to receive a plug from the load 2. The plugs 12 and sockets 10 cooperate with each other and comply with country-specific standards (e.g. Australian/New Zealand Standard AS/NZS 3112). For illustrative purposes, FIG. 1 shows the neutral lead (N) and the conducting lead (L).

The control apparatus 1 has a ripple control receiver 6, a switch 8 and internal wires 14, 15, 16 for internally coupling the plug 12 to the socket 10. In the embodiment shown in FIG. 1, the switch 8 is inserted between the wires 15 and 16 that connect to the L lead. The ripple control receiver 6 is connected to the wires 14 and 15. The switch 8 is controllable by the ripple control receiver 6, as indicated by a control line 8*a*.

The ripple control receiver 6 includes in one embodiment a processing unit 18 and a serial arrangement of a switch 20 and a relay coil 24. The switch 20 connects to the wire 15 between the switch 8 and the plug 12, and the relay coil 24 connects to the N lead (wire 14). The processing unit 18 controls the switch 20 by means of a control line 18a and, hence, controls also the activation and deactivation of the relay coil 24. When energized, the relay coil 24 causes the switch 8, depending on the particular configuration, to open or to close by means of the control line 8a. In FIG. 1, the relay coil 24 is not energized because the switch 20 is open, and the switch 8 is open, as well. The load 2 is, therefore, switched off in FIG. 1.

It is contemplated that the control apparatus 1 may be configured to allow overriding the control operation of the processing unit 18, i.e., the switching triggered by the processing unit 18. In such an embodiment, the control apparatus 1 may be modified to include, or to have the function of an override switch 22. In one embodiment, the override switch 22 may be connected to the processing unit 18. For illustrative purposes, the override switch 22 is shown in dashed lines. At a given moment, for example, switching the air conditioning system off may be inconvenient for a consumer. In that case, the consumer may press the override switch 22 and thereby switch the previously switched off air conditioning system on again.

The ripple control receiver 6 and the processing unit 18 may be based on a conventional technology, for example, as described in the above-mentioned GB 2 171 278. Briefly, the ripple control receiver 6 receives a control signal or message comprised of a series of pulses sent by the PCU's central station over the electricity distribution network. The ripple control receiver 6 obtains the message from the electricity distribution network, processes and executes the message.

Figure 2:
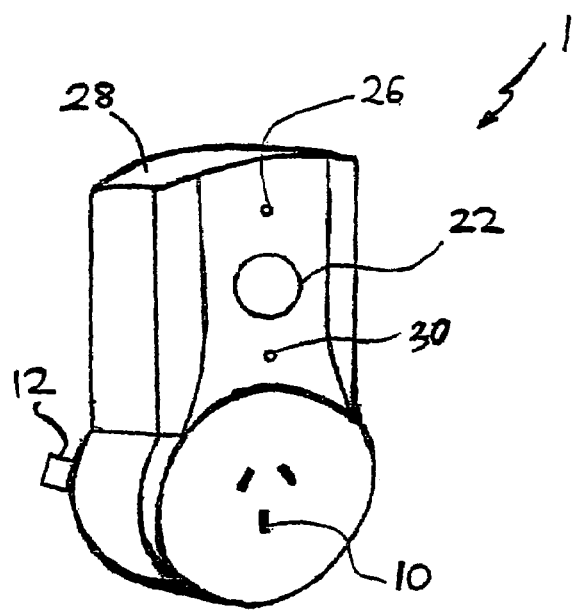
FIG. 2 is an illustration of one exemplary embodiment of the control apparatus shown in FIG. 1.

As shown in the embodiment of FIG. 2, the various components of the control apparatus 1 may be mounted within a housing 28. In the illustrated embodiment, the socket 10, the plug 12, the override switch 22 and an indicator 26 are visible from outside the housing 28. Hence, a consumer can safely and conveniently handle the control apparatus 1 and interconnect it between any load and any power outlet of the house. As such, the control apparatus 1 may be viewed as a mobile load control apparatus that can be plugged into any power point in a residential, commercial or industrial environment.

The indicator 26 indicates the status of the control apparatus 1, i.e., the status of the last ripple control signal valid for the control apparatus 1. The indicator 26 may include a light source, such as an LED or a glow lamp. In one embodiment, the processing unit 18 turns the LED off if the ripple control signal signaled the low price non-congestion rate, and it turns the LED on if the ripple control signal signaled the high price congestion rate. A flashing LED indicates that the control apparatus 1 has not yet received a valid message.

In another embodiment, the control apparatus 1 may be equipped to indicate the position (open or closed) of the switch 8 to indicate whether the load is turned off or on. The position may be indicated by means of a light source (LED or glow lamp) or a mechanical device, such as a lever, next to the switch 8. For illustrative purposes, FIG. 2 shows an additional indicator 30 for indicating the position of the switch 8.

The general operational features and parameters (such as ripple control frequency, sensitivity and ripple control commands) of the ripple control receiver 6 may be set during manufacture of the control apparatus 1. In certain embodiments, these features and parameters may be modified later, for example, manually at a customer site. For that purpose, the control apparatus 1 may have a setup device 32, for example, one or more DIP or selector switches or an interface, e.g., an optical interface.

In addition to the above-described embodiments of the control apparatus 1, a skilled artisan will recognize that the control apparatus 1 may advantageously include any, some, or all of the features and aspects discussed in the foregoing description with reference to FIGS. 1 to 2. Additionally, other combinations, omissions, substitutions and modifications will be apparent to the skilled artisan in view of the disclosure herein. Accordingly, the present invention is not intended to be limited by the reaction of the described embodiments, but is to be defined by reference to the appended claims.

The invention claimed is:

1. A control apparatus for controlling an electrical load, comprising:
    a housing;
    a plug mounted to the hosing for connecting the control apparatus to a power outlet;
    a socket mounted to the housing for connecting the control apparatus to the electrical load;
    first and second internal wires connecting the plug to the socket;
    a first switch located in the second internal wire between the plug and the socket;
    a ripple control receiver unit mounted within the housing and coupled to the wires connecting the plug and the socket, wherein the receiver unit is configured to receive a control signal that is indicative of an impending congestion period, and wherein the receiver unit is configured to interrupt supply of power to the socket upon receipt of the control signal by opening the first switch in the second internal wire; and
    wherein the ripple control receiver has a relay coil connected to the first internal wire, and also connected to the first switch by a control line, a second switch connected to the relay coil and also to the second internal wire between the plug and the first switch, whereby the control receiver controls the second switch and the energization of the relay coil by activation or deactivation of the relay coil to thereby control opening or closing of the first switch.

2. The control apparatus of claim 1, further comprising an override switch selectively operable to enable supply of power to the socket following an interruption triggered by the receiver unit.

3. The control apparatus of claim 1, further comprising an indicator to signal whether or not the receiver unit received the control signal indicative of the congestion period.

4. The control apparatus of claim 1, further comprising a setup device to set operational parameters manually.

5. The control apparatus of claim 1, wherein the receiver unit is configured to receive the control signal over an electricity distribution network.

6. The control apparatus of claim 1 further comprising an override switch selectively operable to enable supply of power to the socket following an interruption triggered by the receiver unit, an indicator to signal whether or not the receiver unit received the control signal indicative of the congestion period, a setup device to set operational parameters manually, and wherein the receiver unit is configured to receive the control signal over an electricity distribution network.

7. A method of controlling an electrical load, comprising:
    receiving, at a ripple control receiver mounted in a control apparatus, a control signal that is indicative of an impending congestion period, wherein the control apparatus comprises:
        a housing;
        a plug mounted to the housing for connecting the control apparatus to a power outlet;

a socket mounted to the housing for connecting the control apparatus to the electrical load;

first and second internal wires connecting the plug to the socket;

a first switch located in the second internal wire between the plug and the socket;

wherein the ripple control receiver unit is mounted within the control apparatus housing and coupled to the wires connecting the plug and the socket, wherein the receiver unit is configured to receive the control signal that is indicative of the impending congestion period, and wherein the receiver unit is configured to interrupt supply of power to the socket upon receipt of the control signal by opening the first switch in the second internal wire; and wherein the ripple control receiver has a relay coil connected to the first internal wire, and also connected to the first switch by a control line, a second switch connected to the relay coil and also to the second internal wire between the plug and the first switch, whereby the control receiver controls the second switch and the energization of the relay coil by activation or deactivation of the relay coil to thereby control opening or closing of the first switch.

8. The method of claim 7, further comprising indicating whether or not the receiver unit received the control signal.

9. The method of claim 7, further comprising selectively enabling a supply of power to the socket by an override switch following an interruption triggered by the receiver unit.

10. The method of claim 7, further comprising setting operational parameters manually.

11. The method of claim 7, wherein receiving the control signal includes receiving an electrical signal over an electricity distribution network.

12. The method of claim 7 further comprising indicating whether or not the receiver unit received the control signal, selectively enabling a supply of power to the socket by an override switch following an interruption triggered by the receiver unit, setting operational parameters manually, and receiving the control signal includes receiving an electrical signal over an electricity distribution network.

* * * * *